US011552731B2

(12) United States Patent
Cammerer et al.

(10) Patent No.: US 11,552,731 B2
(45) Date of Patent: Jan. 10, 2023

(54) LEARNING IN COMMUNICATION SYSTEMS BY UPDATING OF PARAMETERS IN A RECEIVING ALGORITHM

(71) Applicant: Nokia Technologies Oy, Espoo (FI)

(72) Inventors: Sebastian Cammerer, Bad Mergentheim (DE); Sebastian Dörner, Bad Mergentheim (DE); Stefan Schibisch, Marbach (DE); Jakob Hoydis, Paris (FR)

(73) Assignee: Nokia Technologies Oy, Espoo (FI)

( * ) Notice: Subject to any disclaimer, the term of this patent is extended or adjusted under 35 U.S.C. 154(b) by 205 days.

(21) Appl. No.: 17/260,441

(22) PCT Filed: Jul. 20, 2018

(86) PCT No.: PCT/EP2018/069843
§ 371 (c)(1),
(2) Date: Jan. 14, 2021

(87) PCT Pub. No.: WO2020/015840
PCT Pub. Date: Jan. 23, 2020

(65) Prior Publication Data
US 2021/0306092 A1     Sep. 30, 2021

(51) Int. Cl.
*H04L 1/00* (2006.01)
(52) U.S. Cl.
CPC .......... *H04L 1/0047* (2013.01); *H04L 1/0061* (2013.01)
(58) Field of Classification Search
None
See application file for complete search history.

(56) References Cited

U.S. PATENT DOCUMENTS 7,027,531 B2    4/2006  Blankenship et al.
9,129,190 B1 *  9/2015  Ranzato ............ G06V 10/7747
(Continued)

FOREIGN PATENT DOCUMENTS

| EP | 3418821 A1 | 12/2018 |
| EP | 3418948 A1 | 12/2018 |
| WO | 2019/192740 A1 | 10/2019 |

OTHER PUBLICATIONS

Schibisch, Stefan et al. "Online Label Recovery for Deep Learning-based Communication through Error Correcting Codes." https://arxiv.org/abs/1807.00747 (Jul. 2, 2018).*

(Continued)

*Primary Examiner* — Andrew C Oh
(74) *Attorney, Agent, or Firm* — Nokia Technologies Oy

(57) ABSTRACT

An apparatus, method and computer program is described comprising receiving data at a receiver of a transmission system; using a receiver algorithm to convert data received at the receiver into an estimate of the first coded data, the receiver algorithm having one or more trainable parameters; generating an estimate of first data bits by decoding the estimate of the first coded data, said decoding making use of an error correction code of said encoding of the first data bits; generating a refined estimate of the first coded data by encoding the estimate of the first data bits; generating a loss function based on a function of the refined estimate of the first coded data and the estimate of the first coded data; updating the trainable parameters of the receiver algorithm in order to minimise the loss function; and controlling a repetition of updating the trainable parameters by generating, for each repetition, for the same received data, a further refined estimate of the first coded data, a further loss function and further updated trainable parameters.

16 Claims, 7 Drawing Sheets

(56) References Cited

U.S. PATENT DOCUMENTS

| | | | | |
|---|---|---|---|---|
| 10,707,996 | B2* | 7/2020 | Wu | G06N 7/005 |
| 11,308,385 | B2* | 4/2022 | Abadi | G06N 3/084 |
| 11,334,807 | B1* | 5/2022 | O'Shea | G06N 20/00 |
| 2001/0004390 | A1* | 6/2001 | Pukkila | H04L 25/023 |
| | | | | 375/350 |
| 2001/0019589 | A1* | 9/2001 | Kim | H04N 21/235 |
| | | | | 375/E7.025 |
| 2004/0052318 | A1* | 3/2004 | Traeber | H03M 13/4107 |
| | | | | 714/795 |
| 2005/0226343 | A1* | 10/2005 | Levy | H04L 27/2602 |
| | | | | 375/267 |
| 2006/0146830 | A1* | 7/2006 | Lin | H04N 19/46 |
| | | | | 375/E7.262 |
| 2006/0182208 | A1* | 8/2006 | Lee | H04L 1/0643 |
| | | | | 375/267 |
| 2007/0033494 | A1* | 2/2007 | Wenger | H04N 19/147 |
| | | | | 375/E7.153 |
| 2010/0183101 | A1* | 7/2010 | Mundarath | H04L 1/0048 |
| | | | | 375/341 |
| 2011/0219287 | A1* | 9/2011 | Srinivas | G06F 11/10 |
| | | | | 714/752 |
| 2011/0299617 | A1* | 12/2011 | Maddah-Ali | H04L 25/03891 |
| | | | | 375/267 |
| 2012/0250785 | A1* | 10/2012 | Vidal | H03M 13/251 |
| | | | | 375/295 |
| 2016/0098633 | A1* | 4/2016 | Min | G06N 3/08 |
| | | | | 706/25 |
| 2016/0234844 | A1 | 8/2016 | Nasir | |
| 2017/0161635 | A1* | 6/2017 | Oono | G06N 7/005 |
| 2018/0032871 | A1* | 2/2018 | Holt | G06N 3/0454 |
| 2018/0075347 | A1* | 3/2018 | Alistarh | G06N 3/084 |
| 2018/0114108 | A1* | 4/2018 | Lao | G06N 3/0445 |
| 2018/0174050 | A1* | 6/2018 | Holt | G06N 3/0454 |
| 2018/0176232 | A1* | 6/2018 | Rodriguez | H04L 61/4511 |
| 2018/0176578 | A1* | 6/2018 | Rippel | G06V 30/19173 |
| 2018/0268220 | A1* | 9/2018 | Lee | G06V 20/20 |
| 2018/0276817 | A1* | 9/2018 | Isgum | G06V 20/653 |
| 2018/0329883 | A1* | 11/2018 | Leidner | G06F 40/247 |
| 2018/0332301 | A1* | 11/2018 | Tian | H03M 7/60 |
| 2018/0357540 | A1* | 12/2018 | Hwang | G06N 3/0454 |
| 2019/0019311 | A1* | 1/2019 | Hu | G06T 7/90 |
| 2019/0087311 | A1* | 3/2019 | Donaldson | G06N 3/08 |
| 2019/0139193 | A1* | 5/2019 | Navarrete Michelini | |
| | | | | G06T 3/4046 |
| 2019/0171929 | A1* | 6/2019 | Abadi | G06N 3/084 |
| 2019/0189111 | A1* | 6/2019 | Watanabe | G06N 3/08 |
| 2019/0197409 | A1* | 6/2019 | Frinken | G06N 3/08 |
| 2019/0205606 | A1* | 7/2019 | Zhou | G06N 3/0445 |
| 2019/0213601 | A1* | 7/2019 | Hackman | G06N 3/088 |
| 2019/0228310 | A1* | 7/2019 | Inagaki | G06K 9/6271 |
| 2019/0267010 | A1* | 8/2019 | Li | G10L 15/142 |
| 2019/0287012 | A1* | 9/2019 | Celikyilmaz | G06N 3/0445 |
| 2019/0287217 | A1* | 9/2019 | Cooke | G06N 3/0472 |
| 2019/0355270 | A1* | 11/2019 | McCann | G06N 3/082 |
| 2019/0371052 | A1* | 12/2019 | Kehl | G06V 10/82 |
| 2020/0041550 | A1* | 2/2020 | Borean | G05B 17/02 |
| 2020/0094405 | A1* | 3/2020 | Davidson | B25J 9/1697 |
| 2020/0403723 | A1* | 12/2020 | Hoydis | H04L 5/0044 |
| 2021/0218607 | A1* | 7/2021 | Ait Aoudia | H04L 27/04 |
| 2021/0306092 | A1* | 9/2021 | Cammerer | H04L 25/03019 |
| 2021/0367654 | A1* | 11/2021 | Goutay | H04L 27/0008 |
| 2021/0374529 | A1* | 12/2021 | Ait Aoudia | G06N 3/084 |
| 2022/0004848 | A1* | 1/2022 | Hoydis | G06N 3/0454 |
| 2022/0006477 | A1* | 1/2022 | Hoydis | H04B 1/40 |
| 2022/0083870 | A1* | 3/2022 | Ait Aoudia | G06N 3/086 |
| 2022/0191067 | A1* | 6/2022 | Ait Aoudia | H04B 17/373 |
| 2022/0191079 | A1* | 6/2022 | Hoydis | H04L 1/206 |
| 2022/0209888 | A1* | 6/2022 | Hoydis | G06N 3/08 |
| 2022/0247614 | A1* | 8/2022 | Hoydis | H04L 27/3405 |

OTHER PUBLICATIONS

Wang, Tianqi et al. "Deep Learning for Wireless Physical Layer: Opportunities and Challenges." https://arxiv.org/abs/1710.05312 (Oct. 27, 2017).*

Neumann, David et al. "Learning the MMSE Channel Estimator." https://arxiv.org/abs/1707.05674 (Feb. 6, 2018).*

O'Shea et al., "An Introduction to Machine Learning Communications Systems", arXiv, Feb. 2, 2017, pp. 1-10.

Dorner et al., "Deep Learning Based Communication Over the Air", IEEE Journal of Selected Topics in Signal Processing, vol. 12, No. 1, Feb. 2018, pp. 132-143.

O'Shea et al., "Learning to Communicate: Channel Auto-encoders, Domain Specific Regularizers, and Attention", IEEE International Symposium on Signal Processing and Information Technology (ISSPIT), Dec. 12-14, 2016, 6 pages.

Aoudia et al., "End-to-End Learning of Communications Systems Without a Channel Model", arXiv, Dec. 5, 2018, 6 pages.

Hagenauer, "The Turbo Principle in Mobile Communications", Proceedings of the International Symposium on Infomnation Theory and Its Applications, Oct. 7-11, 2002, 6 pages.

He et al., "Deep Residual Learning for Image Recognition", IEEE Conference on Computer Vision and Pattern Recognition, Jun. 27-30, 2016, pp. 770-778.

Grant, "Joint Decoding and Channel Estimation for Space-Time Codes", Vehicular Technology Conference Fall, 52nd Vehicular Technology Conference (Cat. No. 00CH37152), Sep. 24-28, 2000, 5 pages.

Koetter et al., "Turbo Equalization", IEEE Signal Processing Magazine, vol. 21, No. 1, Jan. 2004, pp. 1-14.

Nissila, "Iterative Receivers for Digital Communications via Variational Inference and Estimation", Dissertation, Jan. 18, 2008, 232 pages.

Invitation to Pay Additional Fees and Partial Search Report received for corresponding Patent Cooperation Treaty Application No. PCT/EP2018/069843, dated Apr. 4, 2019, 14 pages.

Higashinaka et al., "Channel Estimation with Interference Cancellation for a MIMO Receiver Using Iterative Equalization and Decoding", IEEE 19th International Symposium on Personal, Indoor and Mobile Radio Communications, Sep. 15-18, 2008, 5 pages.

Sharma et al., "Forward-Error-Control (FEC)-Assisted Adaptive Equalization for Digital Cellular Mobile Radio", IEEE Transactions on Vehicular Technology, vol. 42, No. 1, Feb. 1993, pp. 94-102.

International Search Report and Written Opinion received for corresponding Patent Cooperation Treaty Application No. PCT/EP2018/069843, dated May 24, 2019, 21 pages.

Hamalainen et al., "Neural Approach to Turbo Equalization", 14th IEEE Proceedings on Personal, Indoor and Mobile Radio Communications, Sep. 7-10, 2003, pp. 2088-2092.

Choi et al., "Kalman Filter-Trained Recurrent Neural Equalizers for Time-Varying Channels", IEEE Transactions on Communications, vol. 53, No. 3, Mar. 2005, pp. 472-480.

* cited by examiner

LEARNING IN COMMUNICATION SYSTEMS BY UPDATING OF PARAMETERS IN A RECEIVING ALGORITHM

RELATED APPLICATION

This application claims priority to PCT Application No. PCT/EP2018/069843, filed on Jul. 20, 2018 which is incorporated herein by reference in its entirety.

FIELD

The present specification relates to learning in communication systems. In particular, the specification relates to training parameters of a receiver of a communication system.

BACKGROUND

A simple communications system includes a transmitter, a transmission channel, and a receiver. The transmitter and/or the receiver may include trainable parameters in order to enable the principles of machine learning to be used to improve performance aspects of the communications system. There remains scope for further developments in this area.

SUMMARY

In a first aspect, this specification describes an apparatus comprising: means for receiving data at a receiver of a transmission system, wherein the transmission system comprises an encoder that generates first coded data by encoding first data bits, a transmitter, a channel and the receiver; means for using a receiver algorithm to convert data received at the receiver from the transmitter over the channel into an estimate of the first coded data, the receiver algorithm having one or more trainable parameters; means for generating an estimate of the first data bits by decoding the estimate of the first coded data, said decoding making use of an error correction code of said encoding of the first data bits; means for generating a refined estimate of the first coded data by encoding the estimate of the first data bits; means for generating a loss function based on a function of the refined estimate of the first coded data and the estimate of the first coded data; means for updating the trainable parameters of the receiver algorithm in order to minimise the loss function; and means for controlling a repetition of updating the trainable parameters by generating, for each repetition, for the same received data, a further refined estimate of the first coded data, a further loss function and further updated trainable parameters. The means for controlling said repetition may repeat the updating until a condition (such as a set number of iterations and/or until outputs have settled) is reached.

In a second aspect, this specification describes a system comprising: means for encoding first data bits to generate first coded data, wherein the encoding uses an error correction code; means for converting the first coded data into data for transmission; means for transmitting the data for transmission; means for receiving the transmitted data; means for using a receiver algorithm to convert the received data into an estimate of the first coded data, the receiver algorithm having one or more trainable parameters; means for generating an estimate of the first data bits by decoding the estimate of the first coded data, said decoding making use of said error correction code; means for generating a refined estimate of the first coded data by encoding the estimate of the first data bits; means for generating a loss function based on a function of the refined estimate of the first coded data and the estimate of the first coded data; means for updating the trainable parameters of the receiver algorithm in order to minimise the loss function; and means for controlling a repetition of updating the trainable parameters by generating, for each repetition, for the same received data, a further refined estimate of the first coded data, a further loss function and further updated trainable parameters. The means for controlling said repetition may repeat the updating until a condition (such as a set number of iterations and/or until outputs have settled) is reached.

Some embodiments may further comprise means for initialising the trainable parameters of the receiver algorithm.

The means for receiving data at the receiver may receive a plurality of data observations. The means for generating the loss function may generate the loss function from a plurality of loss function calculations generated for each of the plurality of data observations. The means for updating the trainable parameters of the receiver algorithm may minimise an average of the plurality of loss function calculations.

In some embodiments, the means for updating the trainable parameters of the receiver algorithm may minimise the loss function by using gradient descent or reinforcement learning.

Some embodiments may further comprise a second means for controlling a repetition of the updating of the trainable parameters by, for each repetition, using the receiver algorithm to convert second data received at the receiver into an estimate of second coded data on which the received second data is based, generating a second loss function based on a function of a refined estimate of second coded data and the estimate of the second coded data, and updating the trainable parameters in order to minimise the loss function. The second means for controlling said repetition may repeat the updating until a second condition (such as a set number of iterations and/or until outputs have settled) is reached.

Some embodiments may further comprise means for identifying which of estimates of the first data bits are correctly received, wherein the means for generating the loss function may consider only first coded data corresponding to first data bits that are identified as being correctly received. A parity check means may be provided for identifying which estimates of the first data bits are correctly received. The means for identifying which estimates of the first data bits are correctly received may, for example, comprise a cyclic redundancy check module.

The trainable parameters of the receiver algorithm may be provided (at least in part) as part of an equalisation module that forms part of the receiver of the transmission module. For example, the equalisation module may be a pre-equalisation module provided before a receiver module of the receiver of the transmission system. Alternatively, the equalisation module may be a post-equalisation module provided after a receiver module of the receiver of the transmission system. The equalisation module may be provided in other ways and may, for example, be distributed.

In some forms of the invention, the means may comprise: at least one processor; and at least one memory including computer program code, the at least one memory and computer program code configured to, with the at least one processor, cause the performance of the apparatus.

In a third aspect, this specification describes a method comprising: receiving data at a receiver of a transmission system, wherein the transmission system comprises an encoder that generates first coded data by encoding first data bits, a transmitter, a channel and the receiver; using a receiver algorithm to convert data received at the receiver from the transmitter over the channel into an estimate of the first coded data, the receiver algorithm having one or more trainable parameters; generating an estimate of the first data bits by decoding the estimate of the first coded data, said decoding making use of an error correction code of said encoding of the first data bits; generating a refined estimate of the first coded data by encoding the estimate of the first data bits; generating a loss function based on a function of the refined estimate of the first coded data and the estimate of the first coded data; updating the trainable parameters of the receiver algorithm in order to minimise the loss function; and controlling a repetition of updating the trainable parameters by generating, for each repetition, for the same received data, a further refined estimate of the first coded data, a further loss function and further updated trainable parameters. Controlling said repetition may comprise repeating the updating until a condition (such as a set number of iterations and/or until outputs have settled) is reached.

In a fourth aspect, this specification describes a method comprising: encoding first data bits to generate first coded data, wherein the encoding uses an error correction codes; converting the first coded data into data for transmission; transmitting the data for transmission; receiving the transmitted data; using a receiver algorithm to convert the received data into an estimate of the first coded data, the receiver algorithm having one or more trainable parameters; generating an estimate of the first data bits by decoding the estimate of the first coded data, said decoding making use of said error correction code; generating a refined estimate of the first coded data by encoding the estimate of the first data bits; generating a loss function based on a function of the refined estimate of the first coded data and the estimate of the first coded data; updating the trainable parameters of the receiver algorithm in order to minimise the loss function; and controlling a repetition of updating the trainable parameters by generating, for each repetition, for the same received data, a further refined estimate of the first coded data, a further loss function and further updated trainable parameters. Controlling said repetition may comprise repeating the updating until a condition (such as a set number of iterations and/or until outputs have settled) is reached.

The means for receiving data at the receiver may receive a plurality of data observations. Generating the loss function may comprise generating the loss function from a plurality of loss function calculations generated for each of the plurality of data observations. Updating the trainable parameters of the receiver algorithm may comprise minimising an average of the plurality of loss function calculations.

In some embodiments, updating the trainable parameters of the receiver algorithm may comprise minimising the loss function by using gradient descent or reinforcement learning.

Some embodiments may further comprise controlling a repetition of the updating of the trainable parameters by, for each repetition, using the receiver algorithm to convert second data received at the receiver into an estimate of second coded data on which the received second data is based, generating a second loss function based on a function of a refined estimate of second coded data and the estimate of the second coded data, and updating the trainable parameters in order to minimise the loss function. The second means for controlling said repetition may repeat the updating until a second condition (such as a set number of iterations and/or until outputs have settled) is reached.

Some embodiments may further comprise identifying which of estimates of the first data bits are correctly received, wherein generating the loss function may consider only first coded data corresponding to first data bits that are identified as being correctly received.

In a fifth aspect, this specification describes an apparatus configured to perform any method as described with reference to the third or fourth aspects.

In a sixth aspect, this specification describes computer-readable instructions which, when executed by computing apparatus, cause the computing apparatus to perform any method as described with reference to the third or fourth aspects.

In a seventh aspect, this specification describes a computer program comprising instructions stored thereon for performing at least the following: receiving data at a receiver of a transmission system, wherein the transmission system comprises an encoder that generates first coded data by encoding first data bits, a transmitter, a channel and the receiver; using a receiver algorithm to convert data received at the receiver from the transmitter over the channel into an estimate of the first coded data, the receiver algorithm having one or more trainable parameters; generating an estimate of the first data bits by decoding the estimate of the first coded data, said decoding making use of an error correction code of said encoding of the first data bits; generating a refined estimate of the first coded data by encoding the estimate of the first data bits; generating a loss function based on a function of the refined estimate of the first coded data and the estimate of the first coded data; updating the trainable parameters of the receiver algorithm in order to minimise the loss function; and controlling a repetition of updating the trainable parameters by generating, for each repetition, for the same received data, a further refined estimate of the first coded data, a further loss function and further updated trainable parameters.

In an eighth aspect, this specification describes a computer readable medium (e.g. a non-transitory computer readable medium) comprising program instructions stored thereon for performing at least the following: receiving data at a receiver of a transmission system, wherein the transmission system comprises an encoder that generates first coded data by encoding first data bits, a transmitter, a channel and the receiver; using a receiver algorithm to convert data received at the receiver from the transmitter over the channel into an estimate of the first coded data, the receiver algorithm having one or more trainable parameters; generating an estimate of the first data bits by decoding the estimate of the first coded data, said decoding making use of an error correction code of said encoding of the first data bits; generating a refined estimate of the first coded data by encoding the estimate of the first data bits; generating a loss function based on a function of the refined estimate of the first coded data and the estimate of the first coded data; updating the trainable parameters of the receiver algorithm in order to minimise the loss function; and controlling a repetition of updating the trainable parameters by generating, for each repetition, for the same received data, a further refined estimate of the first coded data, a further loss function and further updated trainable parameters.

In a ninth aspect, this specification describes a computer program comprising instructions stored thereon for performing at least the following: encoding first data bits to generate first coded data, wherein the encoding uses an error correction codes; converting the first coded data into data for transmission; transmitting the data for transmission; receiving the transmitted data; using a receiver algorithm to convert the received data into an estimate of the first coded data, the receiver algorithm having one or more trainable parameters; generating an estimate of the first data bits by decoding the estimate of the first coded data, said decoding making use of said error correction code; generating a refined estimate of the first coded data by encoding the estimate of the first data bits; generating a loss function based on a function of the refined estimate of the first coded data and the estimate of the first coded data; updating the trainable parameters of the receiver algorithm in order to minimise the loss function; and controlling a repetition of updating the trainable parameters by generating, for each repetition, for the same received data, a further refined estimate of the first coded data, a further loss function and further updated trainable parameters.

In a tenth aspect, this specification describes a computer readable medium (e.g. a non-transitory computer readable medium) comprising program instructions stored thereon for performing at least the following: encoding first data bits to generate first coded data, wherein the encoding uses an error correction codes; converting the first coded data into data for transmission; transmitting the data for transmission; receiving the transmitted data; using a receiver algorithm to convert the received data into an estimate of the first coded data, the receiver algorithm having one or more trainable parameters; generating an estimate of the first data bits by decoding the estimate of the first coded data, said decoding making use of said error correction code; generating a refined estimate of the first coded data by encoding the estimate of the first data bits; generating a loss function based on a function of the refined estimate of the first coded data and the estimate of the first coded data; updating the trainable parameters of the receiver algorithm in order to minimise the loss function; and controlling a repetition of updating the trainable parameters by generating, for each repetition, for the same received data, a further refined estimate of the first coded data, a further loss function and further updated trainable parameters.

BRIEF DESCRIPTION OF THE DRAWINGS

Example embodiments will now be described, by way of non-limiting examples, with reference to the following schematic drawings, in which.

DETAILED DESCRIPTION

Figure 1:
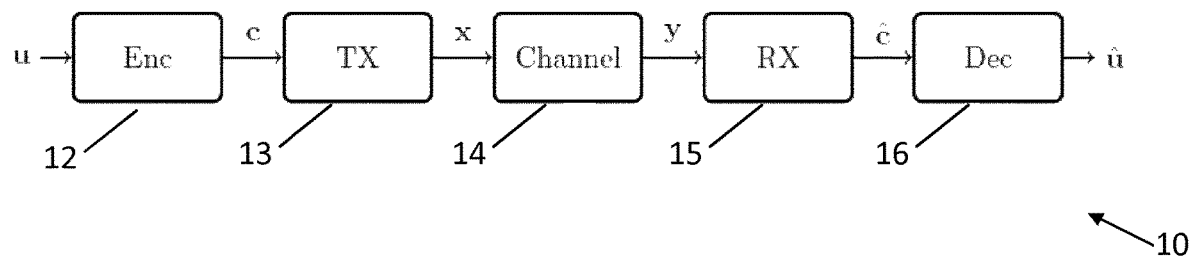
FIG. 1 is a block diagram of an example end-to-end communication system in accordance with an example embodiment.

FIG. 1 is a block diagram of an example end-to-end communication system, indicated generally by the reference numeral 10, in accordance with an example embodiment.

The communication system 10 comprises an encoder 12, a transmitter 13, a channel 14, a receiver 15 and a decoder 16.

The encoder 12 has an input receiving information bits in the form of a vector u and an output for providing a vector c of coded bits, whereby: c=Enc(u).

The transmitter 13 transforms the vector c (i.e. the coded bits) into a transmit vector, whereby: x=TX(c). Thus, x=TX [Enc(u)].

The channel 14 has an input x (the transmit vector) and provides an output vector y to the input of the receiver 15. The channel 14 is characterised by the conditional probability density function p(y|x).

The receiver 15 has an input receiving the output vector y from the channel 14 and outputs a vector ĉ. The vector ĉ is an estimate of c and is based on the received vector y and the receiver function. In other words, the receiver 15 generates an estimate of the vector of coded bits output by the encoder 12.

The receiver 15 has a number of trainable parameters (denoted herein by θ). In other words, the receiver 15 implements the parametric function RX(y; θ). Thus: ĉ=RX (y; θ).

The decoder 16 provides an estimate û of u based on ĉ. In other words, the decoder 16 generates an estimate of the vector of information bits at the input of the encoder 12. The estimate û is given by: û=Dec(ĉ). Thus: û=Dec[RX(y; θ)].

The performance of the communication system 10 is measured by the loss function L(c, ĉ) and it is desirable to choose the trainable parameters θ of the receiver 15 such that the average loss is minimised. This can be expressed as follows:

$$\theta^{\star} = \operatorname*{argmin}_{\theta} \mathbb{E}[L(c, RX(y; \theta))] \tag{1}$$

In equation (1), the expectation is with respect to the inputs u and the channel outputs distributed according to p(y|x). In practice, the equation (1) cannot be solved explicitly because p(y|x) is either unknown or the optimization problem prohibitively complex. However, an approximation can be determined as follows:

$$\hat{\theta}^{\star} = \operatorname*{argmin}_{\theta} \frac{1}{N} \sum_{i=1}^{N} L(c_i, RX(y_i; \theta)) \tag{2}$$

Where $c_i$ is the ith transmitted codeword, $y_i$ is the resulting observation at the receiver 15, and N is the total number of observations. In other words, the expectation in equation (1) is replaced by the sample mean over N examples.

In order to compute the equation (2) above and to optimise the trainable parameters θ, the receiver 15 should have access to the transmitted coded bits c. However, this is generally not the case, since it would imply that known information has been transmitted. In order to address this issue, the decoder and encoder functions of the decoder 15 and the encoder 12 can be used to compute a refined estimate c̃ of the coded bits c, as follows:

$$\tilde{c} = Enc(Dec(\hat{c})) = Enc(Dec(RX(y;\theta))) \quad (3)$$

As described further below, when the information bits in the form of the vector u are encoded by the encoder 12, error correcting codes are used. Thus, when the estimate ĉ of c is decoded into estimated data bits, error correcting codes are used. The resulting estimated data bits can then re-encoded for use as training data to optimise the receiver parameters θ.

Figure 2:
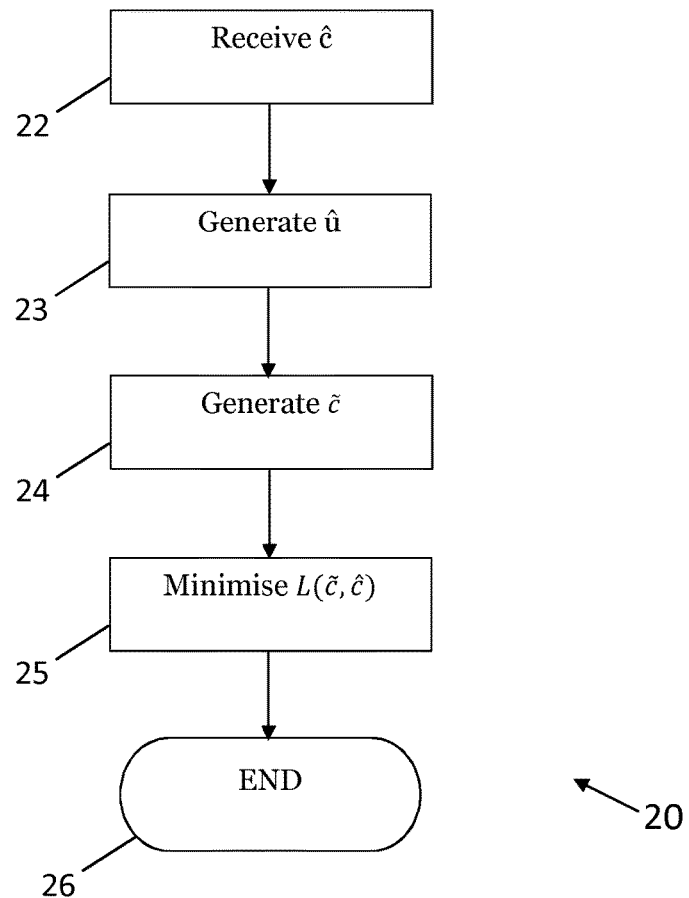
FIGS. 2 to 4 are flow charts showing algorithms in accordance with example embodiments.

FIG. 2 is a flow chart showing an algorithm, indicated generally by the reference numeral 20, in accordance with an example embodiment.

At operation 22 of the algorithm 20, the estimate ĉ that is the output of the receiver 15 is obtained. The operation 22 is implemented by means for receiving data at the receiver 15 of the transmission system 10 and by means for using a receiver algorithm to convert data received at the receiver 15 from the transmitter 13 over the channel 14 of the communication system 19 into an estimate of the first coded data, the receiver algorithm having one or more trainable parameters.

At operation 23 of the algorithm 20, the estimate û that is the output of the decoder 16 is obtained. The operation 23 is implemented by means for generating an estimate of the first data bits by decoding the estimate of the first coded data, said decoding making use of an error correction code of said encoding of the first data bits. Thus, the estimated code bits can be transformed into estimated data bits with the help of the error correction code used to convert the first data bits into the first coded data.

At operation 24, an improved estimate c̃ of the transmitted coded bits is generated. The improved estimate c̃ is generated using error correction codes. The operation 24 is implemented by means for generating a refined estimate of the first coded data by encoding the estimate of the first data bits.

Finally, at operation 25, the difference between estimate ĉ and the improved estimate c̃ of the transmitted coded bits is minimised by minimising the loss function (c̃, ĉ). The is operation 25 is implemented by means for generating a loss function based on a function of the refined estimate of the first coded data and the estimate of the first coded data and by means for updating the trainable parameters of the receiver algorithm in order to minimise the loss function.

The algorithm 20 then terminates at operation 26.

As set out above in equation (3):

$$\tilde{c} = Enc(Dec(\hat{c})) = Enc(Dec(RX(y;\theta))) \quad (3)$$

Using c̃, the receiver 15 can optimise its parameters θ according to:

$$\theta^* = \underset{\theta}{\text{argmin}} \frac{1}{N} \sum_{i=1}^{N} L(\tilde{c}_i, \hat{c}_i) \quad (4)$$

$$= \underset{\theta}{\text{argmin}} \frac{1}{N} \sum_{i=1}^{N} L(Enc(Dec(RX(y_i;\theta))), RX(y_i;\theta)). \quad (5)$$

As described further below, the equation (4) can be applied in an iterative fashion from an initial set of parameters $\theta_0$ as follows:

$$\theta_{n+1} = \underset{\theta_n}{\text{argmin}} \frac{1}{N} \sum_{i=1}^{N} L(Enc(Dec(RX(y_i;\theta_n))), RX(y_i;\theta_n)), \quad n = 0, 1, \ldots \quad (6)$$

Thus, the algorithm 20 may additionally include means for controlling a repetition of updating the trainable parameters by generating, for each repetition, for the same received data, a further refined estimate of the first coded data, a further loss function and further updated trainable parameters.

Figure 3:
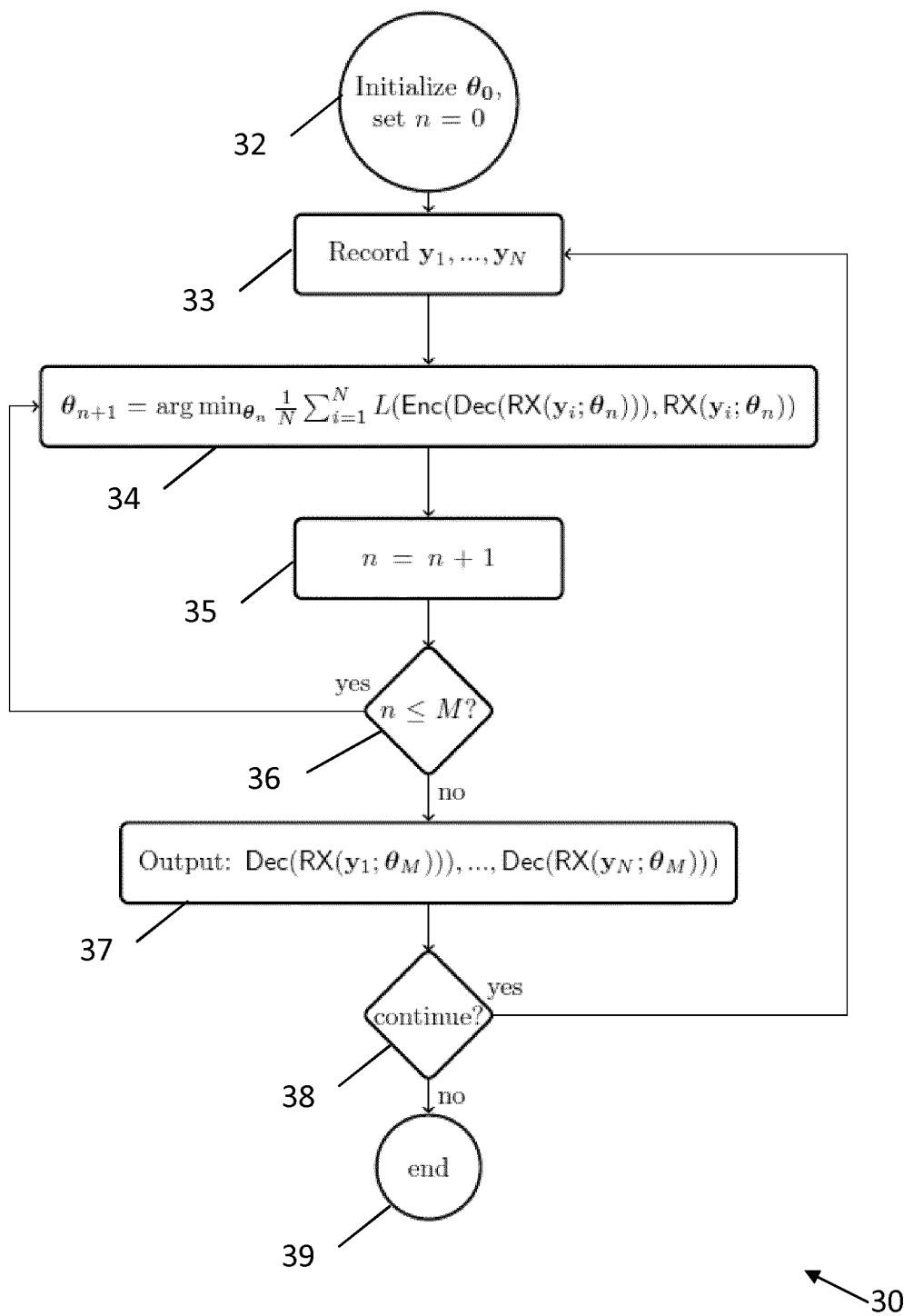

FIG. 3 is a flow chart showing an algorithm, indicated generally by the reference numeral 30, in accordance with an example embodiment.

The algorithm 30 starts at operation 32, where the trainable parameters of the receiver 15 are initialised. Thus, as indicated in FIG. 3, the receiver algorithm parameters may be initialised as $\theta_0$ and n set to 0.

At operation 33, N observations $y_1$ to $y_N$ are recorded. Thus, multiple data points (or observations) are sent to the receiver 15 to provide multiple data points for the algorithm described herein.

At operation 34, the parameters of the receiver are updated to provide $\theta_{n+1}$ as follows:

$$\theta_{n+1} = \underset{\theta_n}{\text{argmin}} \frac{1}{N} \sum_{i=1}^{N} L(Enc(Dec(RX(y_i;\theta_n))), RX(y_i;\theta_n))$$

Thus, the relevant loss function is generated for each of the N observations $y_1$ to $y_N$, on the basis of the current receiver parameters ($\theta_n$), with that loss function being used to iteratively generate updated parameters.

In this way, a plurality of data observations are received by the receiver 15 and a loss function can be generated from a plurality of loss function calculations generated for each of the plurality of data observations. The trainable parameters of the receiver may then be updated to minimise an average of the plurality of loss function calculations. The updating of the trainable parameters of the receiver algorithm may include minimising the loss function by using gradient descent or reinforcement learning.

With the trainable parameters of the receiver updated, the value n is incremented (operation 35) and it is determined (operation 36) whether n is less than or equal to M. If so, the operation 34 is repeated, otherwise the algorithm 30 moves to operation 37.

The number of iterations M (i.e. the number of times that the trainable parameters are updated) can be controlled such that the operation 34 is repeated until a condition is reached. Example conditions include a set number of iterations (as suggested in FIG. 3) and/or until outputs have settled. In some embodiments, it is required that M>1 such that there are at least some iterations occur.

By way of example, the iterations of the operation 34 may be stopped whenever the performance between two iterations does not improve, i.e.:

$$\frac{1}{N} \sum_{i=1}^{N} L(Enc(Dec(RX(y_i;\theta_{n+1})))RX(y_i;\theta_{n+1})) \geq$$

$$\frac{1}{N} \sum_{i=1}^{N} L(Enc(Dec(RX(y_i;\theta_n)))RX(y_i;\theta_n))$$

At operation 37, the output û=Dec[RX(y; θ)] is provided for each value of y received in operation 33. Thus, the operation 37 provides outputs of the communication system 10 based on the current best estimates of the receiver parameters. Note that the output generated in operation 37 is based on multiple iterations of updating the receiver parameters based on the set of data received at operation 33.

At operation 38, it is determined whether to continue updating the receiver parameters. If so, a further set of N observations $y_1$ to $y_N$ are received at a new instance of the operation 33 and the multiple iterations of the operations 34 to 36 carried out. When the operation 38 is answered in the negative, the algorithm 30 terminates at operation 39.

Thus, there may be provided an arrangement for controlling a repetition of the updating of the trainable parameters by, for each repetition, using the receiver algorithm to convert second data (i.e. a second set of observations received at the receiver in a second instance of the operation 33) into an estimate of second coded data on which the received second data is based, generating a second loss function based on a function of a refined estimate of second coded data and the estimate of the second coded data, and updating the trainable parameters in order to minimise the loss function. The arrangement for controlling said repetition may repeat the updating until a second condition is reached, such as a set number of iterations and/or until outputs have settled (as described further above).

In many cases, the optimisation of the trainable parameters θ in equation (4) cannot be solved exactly. In such cases, rather than finding the optimal value θ* one can simply compute an improved version of θ. Multiple options are possible, as set out below.

If RX(y;θ) and L( ) are differentiable, gradient descent on the loss function can be used to obtain an update of θ according to:

$$\hat{\theta}^* = \theta - \eta \nabla_\theta \frac{1}{N} \sum_{i=1}^{N} L(\tilde{c}_i, RX(y_i; \theta_i))$$

where $\tilde{c}_i$ is treated as a constant and η is a small positive quantity known as the learning rate. If also the decoder and encoder functions are differentiable, one can use:

$$\hat{\theta}^* = \theta - \eta \nabla_\theta \frac{1}{N} \sum_{i=1}^{N} L(Enc(Dec(RX(y_i; \theta))), RX(y_i; \theta_i))$$

where the encoder 12, receiver 15 and decoder 16 are implemented as neural networks, they are generally differentiable.

Also, methods from reinforcement learning, such as policy gradients, as well as evolutionary methods and other heuristics can be used to compute updated parameters. Some suitable algorithms are described, for example, in the related patent application PCT/EP2018/065006 entitled "Learning in communication systems", the teaching of which is incorporated herein by reference.

Figure 4:
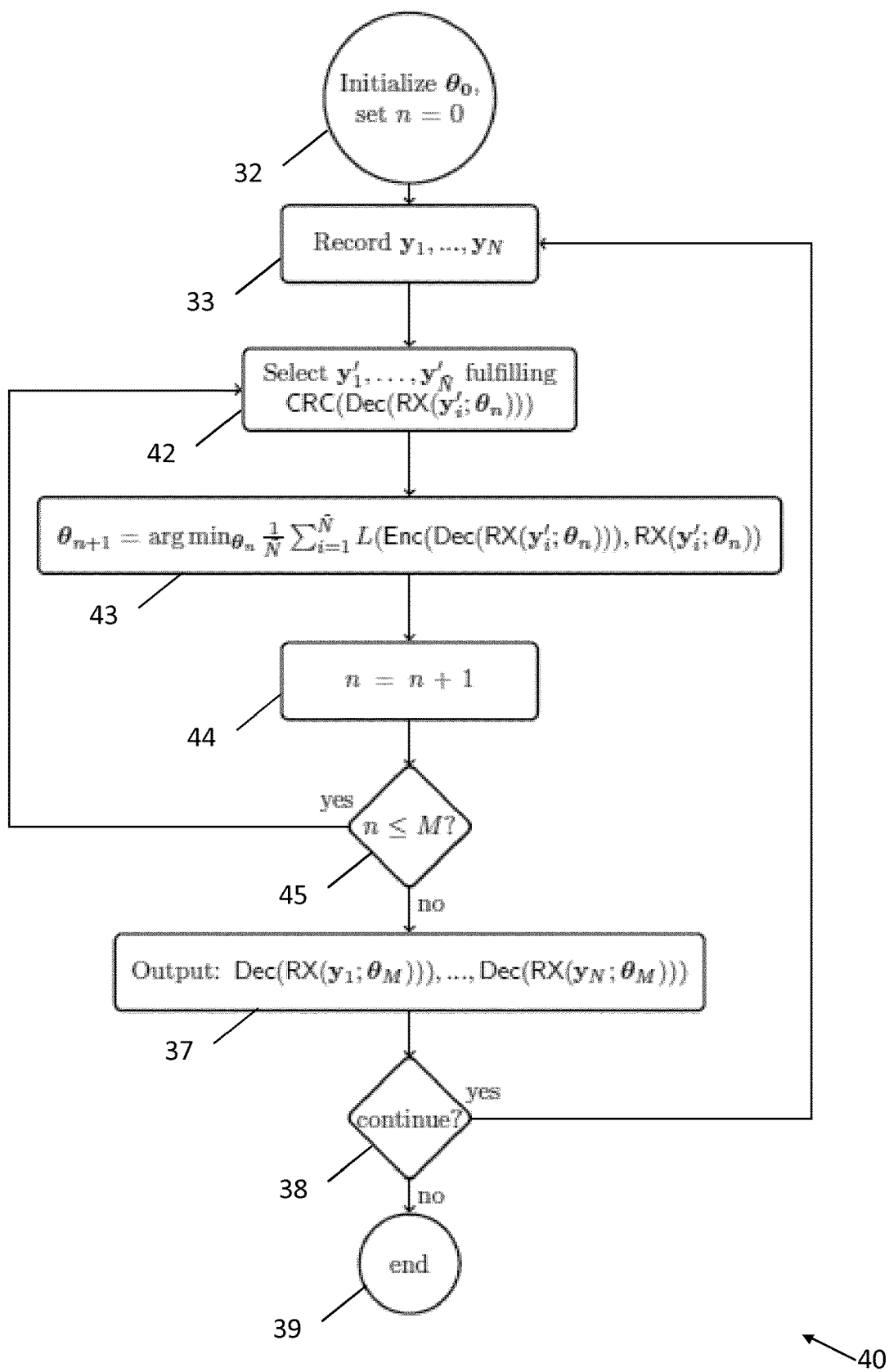

As described above, the algorithms 20 and make use of error correction coding to recover transmitted information bits. The performance of these algorithms suffers in the event that the error correction coding is not able to recover the transmitted bits correctly. FIG. 4 is a flow chart showing an algorithm, indicated generally by the reference numeral 40, that seeks to address this further problem, in accordance with an example embodiment.

As described in further detail below, the algorithm 40 protects the information bit vector u with means for identifying which of estimates of the first data bits are correctly received (for example using a parity check) and only uses those correctly received information bits for training the receiver.

The algorithm 40 starts at operation 32, where the trainable parameters of the receiver 15 are initialised. Next, at operation 33, N observations $y_1$ to $y_N$ are recorded. Thus, multiple data points (or observations) are sent to the receiver 15 to provide multiple data points for the algorithm described herein. The operations 32 and 33 of the algorithm 40 correspond to operations 32 and 33 of the algorithm 30.

At operation 42, for the observations $y_1$ to $y_N$, the set of observations $y_1'$ to $y_N'$ are identified which fulfil CRC(Dec(RX($y_1'$; $\theta_n$))). Thus, the set of observations $y_1'$ to $y_N'$ are the observations that are considered to be correctly received.

At operation 43, the parameters of the receiver are updated to provide $\theta_{n+1}$ as follows:

$$\theta_{n+1} = \underset{\theta_n}{\operatorname{argmin}} \frac{1}{\tilde{N}} \sum_{i=1}^{\tilde{N}} L(Enc(Dec(RX(y_i'; \theta_n))), RX(y_i'; \theta_n))$$

Thus, the relevant loss function is generated for each of the N observations $y_1'$ to $y_N'$, on the basis of the current receiver parameters ($\theta_n$), with that loss function being used to iteratively generate updated parameters.

In this way, a plurality of data observations are received by the receiver 15 and a loss function can be generated from a plurality of loss function calculations generated for each of the plurality of data observations that is considered to be correctly received. The trainable parameters of the receiver may then be updated to minimise an average of the plurality of loss function calculations. The updating of the trainable parameters of the receiver algorithm may include minimising the loss function by using gradient descent or reinforcement learning.

With the trainable parameters of the receiver updated, the value n is incremented (operation 44) and it is determined (operation 45) whether n is less than or equal to M. If so, the operation 43 is repeated, otherwise the algorithm 40 moves to operation 37 (and the operations 37 to 39, as described above, are implemented).

The number of iterations M (i.e. the number of times that the trainable parameters are updated) can be controlled such that the operation 43 is repeated until a condition is reached. Example conditions include a set number of iterations (as suggested in FIG. 4) and/or until outputs have settled. In some embodiments, it is required that M>1 such that there are at least some iterations occur.

The means for identifying which of estimates of the first data bits are correctly received may comprise a parity check means for identifying which estimates of the first data bits are correctly received. Typically block codes, such as a low density parity check codes (LDPC), have this feature. One could say that a received coded bit is valid if all parity checks are satisfied. In some embodiments, the means for identifying which estimates of the first data bits are correctly received may comprise a cyclic redundancy check module.

Figure 5:
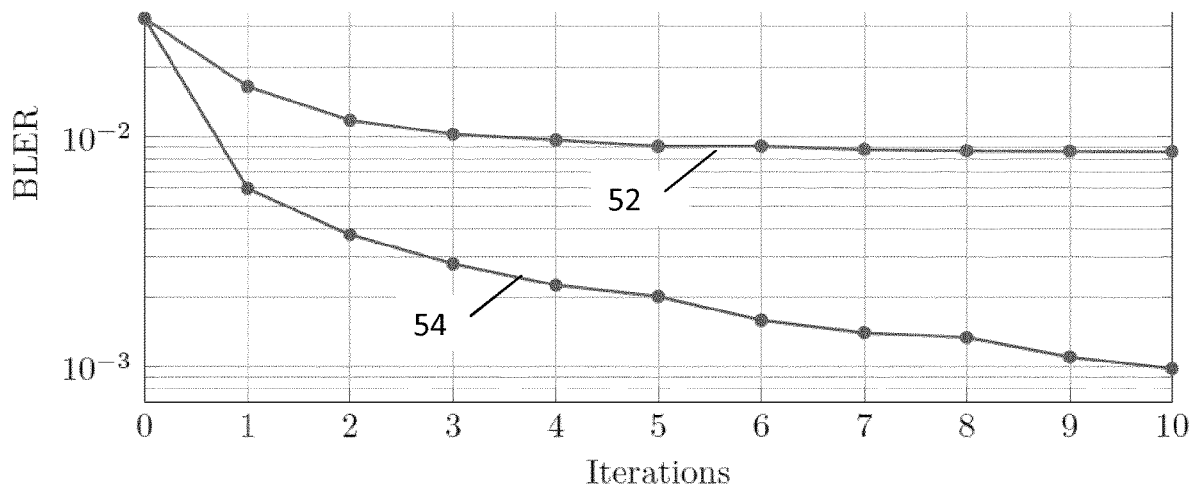
FIG. 5 is a plot showing block error rates in example embodiments.

FIG. 5 is a plot, indicated generally by the reference numeral 50, showing block error rates in example embodiments. The plot 50 includes a first plot 52 showing block error rates in an example implementation of the arrangement of FIG. 3 in which error correction codes are used but no check that bits are correctly received is conducted. The plot 50 also includes a second plot 54 showing block error rates in an example implementation of the arrangement of FIG. 4 in which error correction codes are used, together with a parity check arrangement for determining whether bits are correctly received. As shown in FIG. 5, the block error rate is reduced with increasing iterations. Further, in the particular example of FIG. 5, the block error rate is lower when erroneously received bits are excluded from the training of the receiver algorithm.

In cases where the receiver 15 does not have trainable parameters (or cases in which further training parameters are desired), it is possible to enrich the communication system with trainable parameters through a parametric function $f(.; \theta)$ that may be provided as part of an equalisation module that forms part of the receiver of the transmission module. The equalisation module may be a pre-equalisation module provided before a receiver module of the receiver of the transmission system (as described below with reference to FIGS. 6 and 7). Alternatively, the equalisation module is a post-equalisation module provided after a receiver module of the receiver of the transmission system (as described below with reference to FIG. 8). In a further alternative (not shown), the functionality of the equalisation module may be provided elsewhere (e.g. distributed, such as before and after the receiver module).

Figure 6:
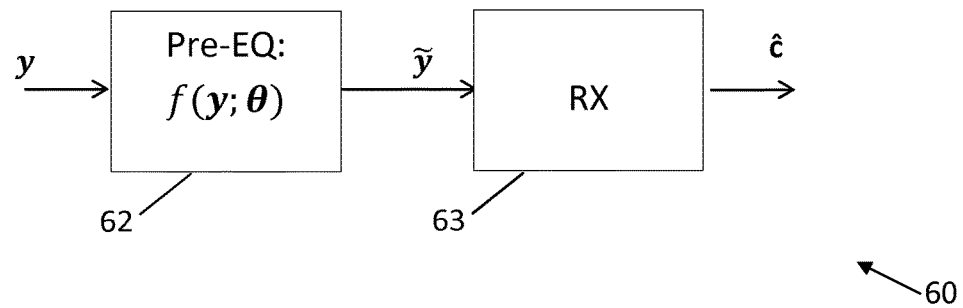
FIG. 6 is a block diagram of a system in accordance with an example embodiment.

FIG. 6 is a block diagram of a system, indicated generally by the reference numeral 60, comprising a pre-equalising module 62 and a receiver module 63. The system 60 is an example implementation of the receiver 15 described above.

The pre-equalising module 62 has an input receiving the output vector y from the channel 14 and provides a modified vector ỹ to the receiver module 63. The receiver module 63 outputs a vector ĉ. The vector ĉ may be an estimate of the vector c (the output of the encoder 12 described above) and is based on the received vector y and function.

Figure 7:
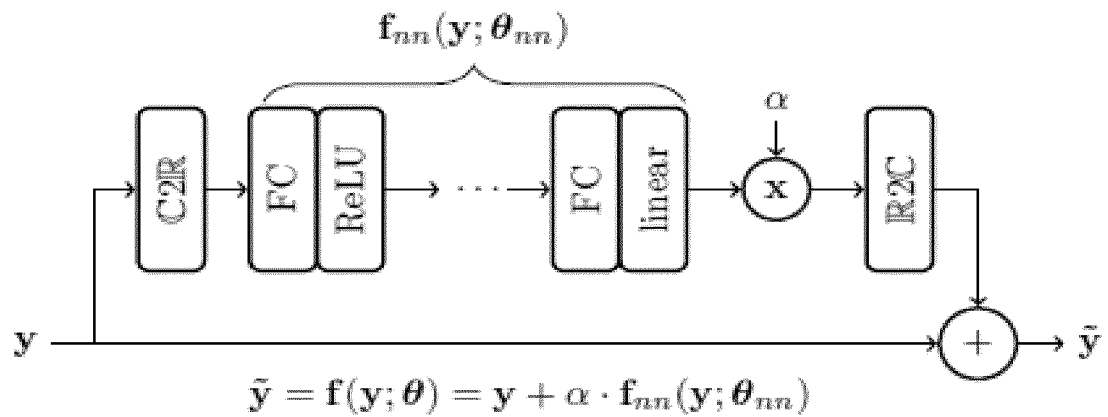
FIG. 7 is a block diagram of an example implementation of part of the system of FIG. 6.

FIG. 7 is a block diagram showing an exemplary implementation of the pre-equalising module 62. The pre-equalising module 62 shown in FIG. 7 implements the function:

$$\tilde{y} = f(y;\theta) = y + \alpha \cdot f_{nn}(y;\theta_{nn})$$

Wherein the scalar a is a trainable function and the function $f_{nn}(x;\theta)$ is a neural network with weights $\theta$. The trainable parameters of the pre-equalizing module are therefore $\theta = \{\alpha, \theta_{nn}\}$. This structure is related to the concept of residual neural networks. Note that an initialisation of $\alpha=0$ deactivates the neural network path such that, without any training, the receiver behaves as originally designed.

Figure 8:
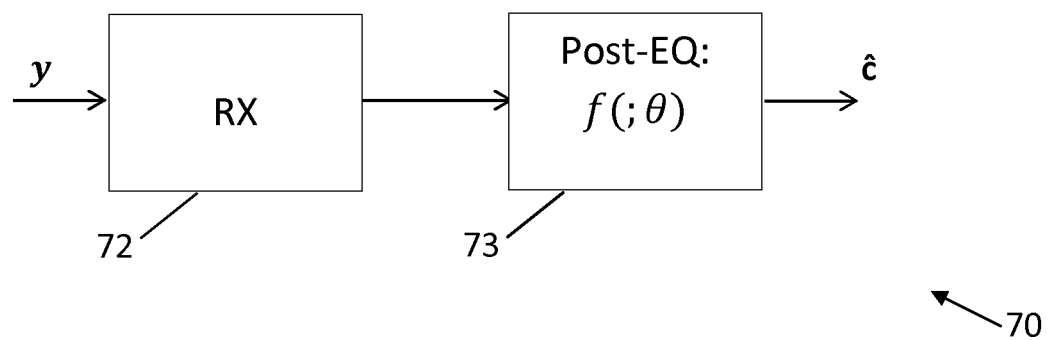
FIG. 8 is a block diagram of a system in accordance with an example embodiment.

FIG. 8 is a block diagram of a system, indicated generally by the reference numeral 70, comprising a receiver module 72 and a post-equalising module 73. The system 70 is an example implementation of the receiver 15 described above.

The system has an input (the input of the received module 72) receiving the output vector y from the channel 14 and outputs a vector ĉ (at the output of the post-equalising module 73). The vector ĉ may be an estimate of the vector c (the output of the encoder 12 described above) and is based on the received vector y and function. The system 70 is therefore similar to the system 60 described above. The post-equalising module therefore provides a refined estimate ĉ as compared to the RX module.

Figure 9:
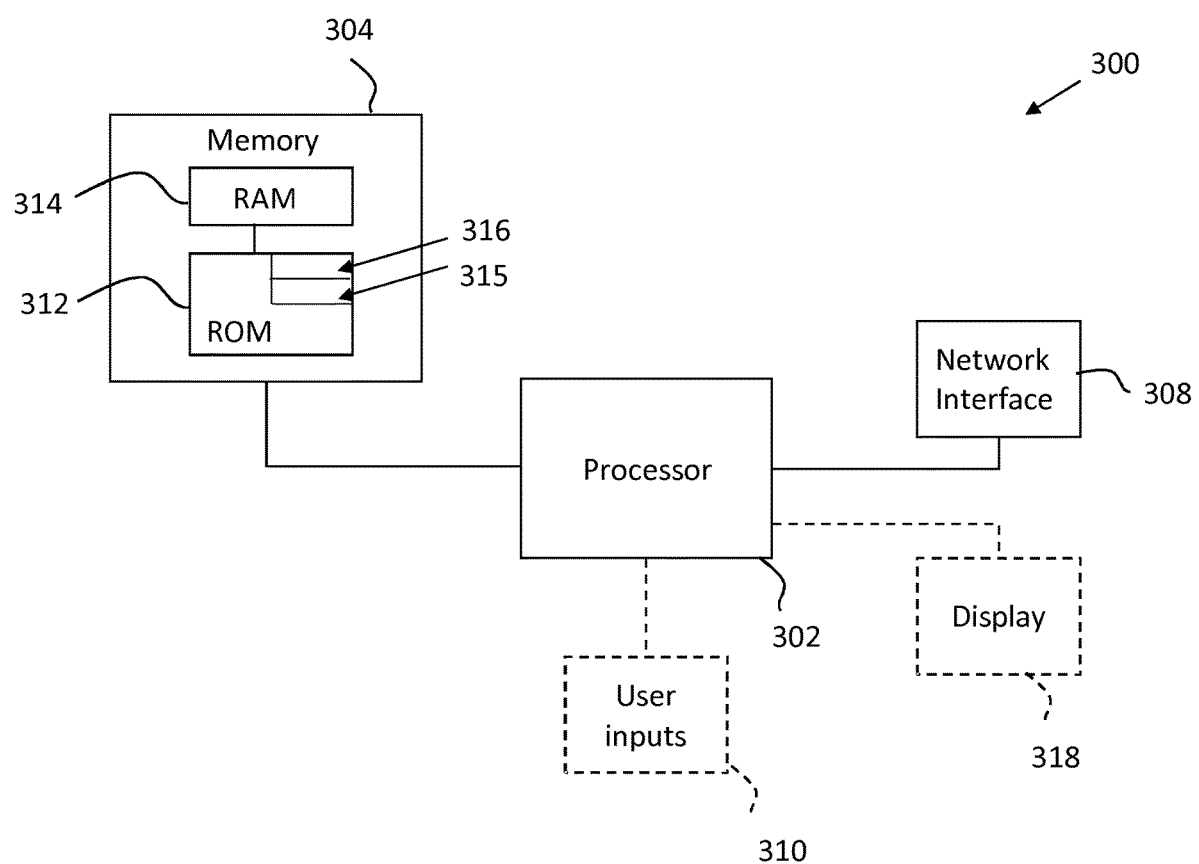
FIG. 9 is a block diagram of components of a system in accordance with an exemplary embodiment.

For completeness, FIG. 9 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 20, 30, or 40 described above. Note that in the case of small device/apparatus the memory can be most suitable for small size usage i.e. not always hard disk drive (HDD) or solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 10A:
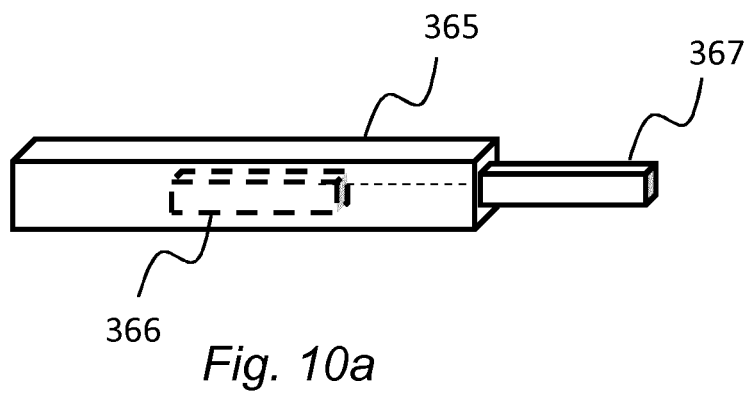
FIGS. 10a and 10b show tangible media, respectively a removable non-volatile memory unit and a compact disc (CD) storing computer-readable code which when run by a computer perform operations according to embodiments.
Figure 10B:
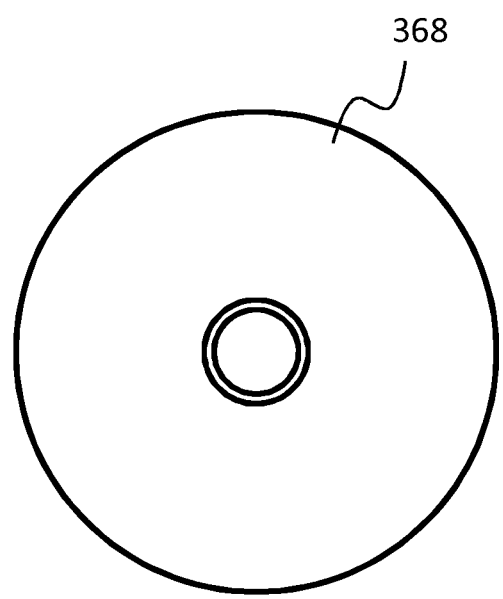

FIGS. 10a and 10b show tangible media, respectively a removable non-volatile memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2, 3 and 4 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor, at least one memory including computer program code, and the at least one processor, with the at least one memory and the computer program code, being arranged to cause the apparatus to at least perform:

receiving data at a receiver of a transmission system, wherein the transmission system comprises an encoder that generates first coded data by encoding first data bits, a transmitter, a channel and the receiver;

using a receiver algorithm to convert data received at the receiver from the transmitter over the channel into an estimate of the first coded data, the receiver algorithm having one or more trainable parameters;

generating an estimate of the first data bits by decoding the estimate of the first coded data, said decoding making use of an error correction code of said encoding of the first data bits;

generating a refined estimate of the first coded data by encoding the estimate of the first data bits;

generating a loss function based on a function of the refined estimate of the first coded data and the estimate of the first coded data;

updating the trainable parameters of the receiver algorithm in order to minimise the loss function; and controlling a repetition of updating the trainable parameters by generating, for each repetition, for the same received data, a further refined estimate of the first coded data, a further loss function and further updated trainable parameters.

2. The apparatus as claimed in claim 1, wherein the controlling said repetition repeats the updating until a condition is reached.

3. The apparatus as claimed in claim 1, further comprising initialising the trainable parameters of the receiver algorithm.

4. The apparatus as claimed in claim 1, wherein:
the receiving data at the receiver receives a plurality of data observations; and
the generating the loss function generates the loss function from a plurality of loss function calculations generated for each of the plurality of data observations.

5. The apparatus as claimed in claim 4, wherein the updating the trainable parameters of the receiver algorithm minimises an average of the plurality of loss function calculations.

6. The apparatus as claimed in claim 1, wherein the updating the trainable parameters of the receiver algorithm minimises the loss function by using gradient descent or reinforcement learning.

7. The apparatus as claimed in claim 1, further comprising a second controlling a repetition of the updating of the trainable parameters by, for each repetition, using the receiver algorithm to convert second data received at the receiver into an estimate of second coded data on which the received second data is based, generating a second loss function based on a function of a refined estimate of second coded data and the estimate of the second coded data, and updating the trainable parameters in order to minimise the loss function.

8. The apparatus as claimed in claim 7, wherein the second controlling said repetition repeats the updating until a second condition is reached.

9. The apparatus as claimed in claim 1, further comprising identifying which of estimates of the first data bits are correctly received, wherein the generating the loss function considers only first coded data corresponding to first data bits that are identified as being correctly received.

10. The apparatus as claimed in claim 9, further comprising a parity check for identifying which estimates of the first data bits are correctly received.

11. The apparatus as claimed in claim 9, wherein the identifying which estimates of the first data bits are correctly received comprises a cyclic redundancy check module.

12. The apparatus as claimed in claim 1, wherein the trainable parameters of the receiver algorithm are provided as part of an equalisation module that forms part of the receiver of the transmission module.

13. The apparatus as claimed in claim 12, wherein the equalisation module is a pre-equalisation module provided before a receiver module of the receiver of the transmission system.

14. The apparatus as claimed in claim 12, wherein the equalisation module is a post-equalisation module provided after a receiver module of the receiver of the transmission system.

15. A method comprising:
receiving data at a receiver of a transmission system, wherein the transmission system comprises an encoder that generates first coded data by encoding first data bits, a transmitter, a channel and the receiver;
using a receiver algorithm to convert data received at the receiver from the transmitter over the channel into an estimate of the first coded data, the receiver algorithm having one or more trainable parameters;
generating an estimate of the first data bits by decoding the estimate of the first coded data, said decoding making use of an error correction code of said encoding of the first data bits;
generating a refined estimate of the first coded data by encoding the estimate of the first data bits;
generating a loss function based on a function of the refined estimate of the first coded data and the estimate of the first coded data;
updating the trainable parameters of the receiver algorithm in order to minimise the loss function; and
controlling a repetition of updating the trainable parameters by generating, for each repetition, for the same received data, a further refined estimate of the first coded data, a further loss function and further updated trainable parameters.

16. A non-transitory computer readable medium comprising program instructions stored thereon for performing at least the following:
receiving data at a receiver of a transmission system, wherein the transmission system comprises an encoder that generates first coded data by encoding first data bits, a transmitter, a channel and the receiver;
using a receiver algorithm to convert data received at the receiver from the transmitter over the channel into an estimate of the first coded data, the receiver algorithm having one or more trainable parameters;
generating an estimate of the first data bits by decoding the estimate of the first coded data, said decoding making use of an error correction code of said encoding of the first data bits;
generating a refined estimate of the first coded data by encoding the estimate of the first data bits;
generating a loss function based on a function of the refined estimate of the first coded data and the estimate of the first coded data;
updating the trainable parameters of the receiver algorithm in order to minimise the loss function; and
controlling a repetition of updating the trainable parameters by generating, for each repetition, for the same received data, a further refined estimate of the first coded data, a further loss function and further updated trainable parameters.

\* \* \* \* \*